United States Patent [19]

Buchanan

[11] Patent Number: 4,603,459

[45] Date of Patent: Aug. 5, 1986

[54] ROCKER BUSHINGS FOR PIVOTAL MOVEMENT

[76] Inventor: James C. Buchanan, 2500 21st St. #42, Winter Haven, Fla. 33881

[21] Appl. No.: 797,260

[22] Filed: Nov. 12, 1985

[51] Int. Cl.[4] .................. B21B 31/08; F16C 25/00
[52] U.S. Cl. ........................................ 29/130; 29/434; 384/271
[58] Field of Search ............ 29/130, 122, 234, 116 R, 29/149.5 R, 149.5 C, 428, 237, 235, 434; 384/296, 271; 308/2 R

[56] References Cited

U.S. PATENT DOCUMENTS

| | | | |
|---|---|---|---|
| 1,748,006 | 2/1930 | Wohlart | 384/296 |
| 2,531,334 | 11/1950 | Grenat | 29/149.5 R |
| 2,913,251 | 11/1959 | Herbenar | 384/271 |
| 3,232,646 | 2/1966 | Stark | 29/463 |
| 4,196,502 | 4/1980 | Johnson | 29/116 R |

Primary Examiner—Howard N. Goldberg
Assistant Examiner—Irene Golabi
Attorney, Agent, or Firm—Duckworth, Allen, Dyer

[57] ABSTRACT

A rocker bushing for a roller structure for supporting a boat on a trailer bed and having a male and female member formed of two cylindrical portions surrounding the shaft and supporting the roller. Each cylindrical member having a tapered longitudinal portion but terminating in a radially outwardly extending stop flange of increased radial thickness. The bearing surface of the rocker bushing positionally adjacent to the shaft is curved to allow the roller to gimbal or wobble to engage the angle of a boat hull. The integral construction of the rocker bushing provides support across the entire width of the roller.

18 Claims, 3 Drawing Figures

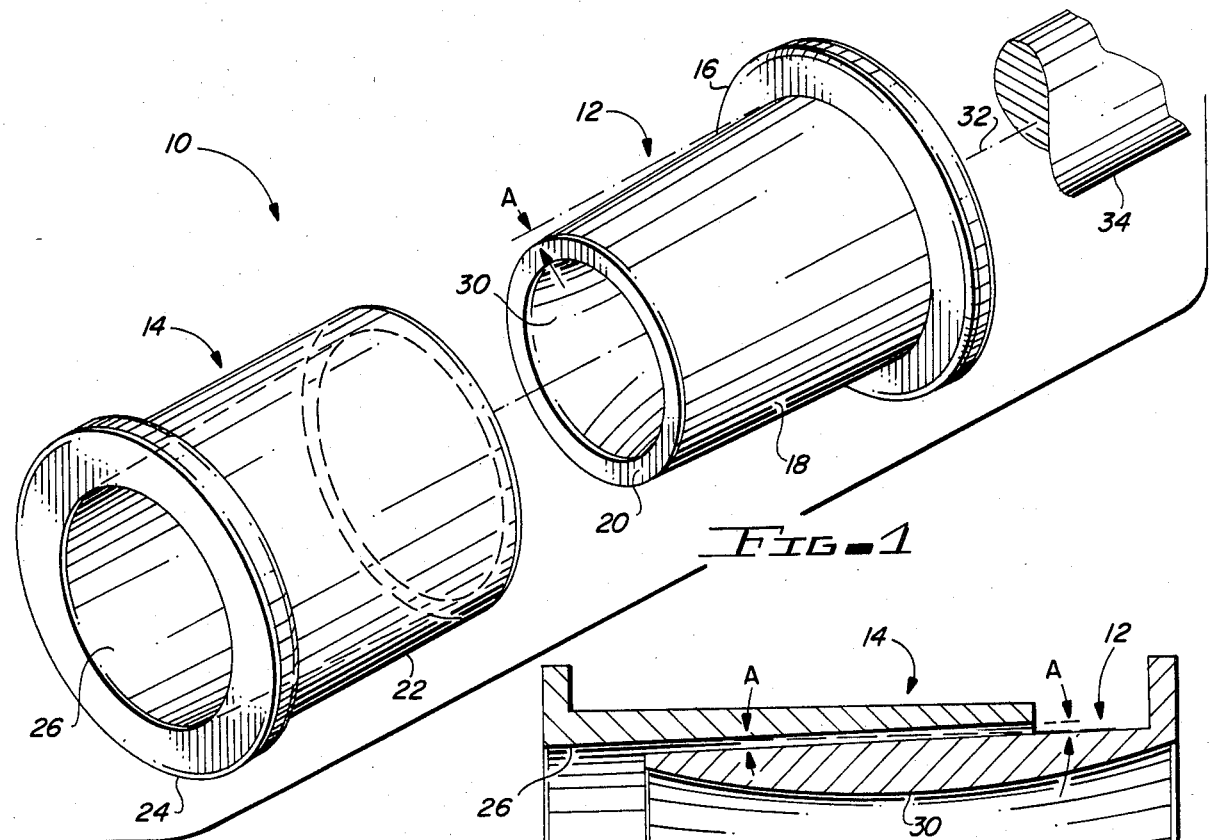
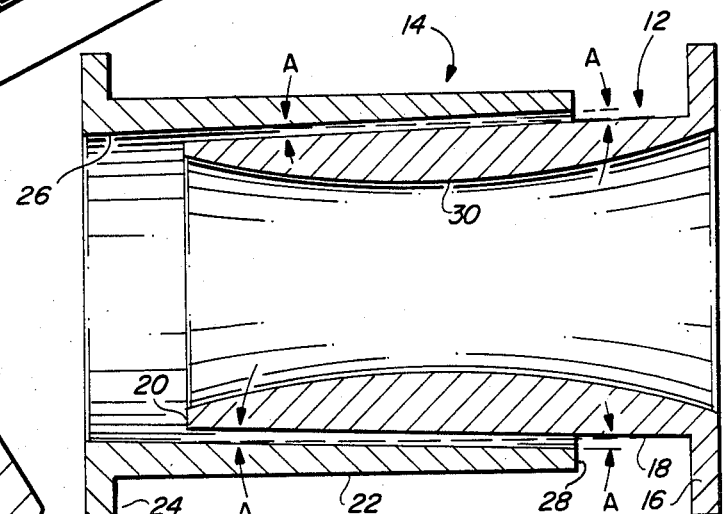
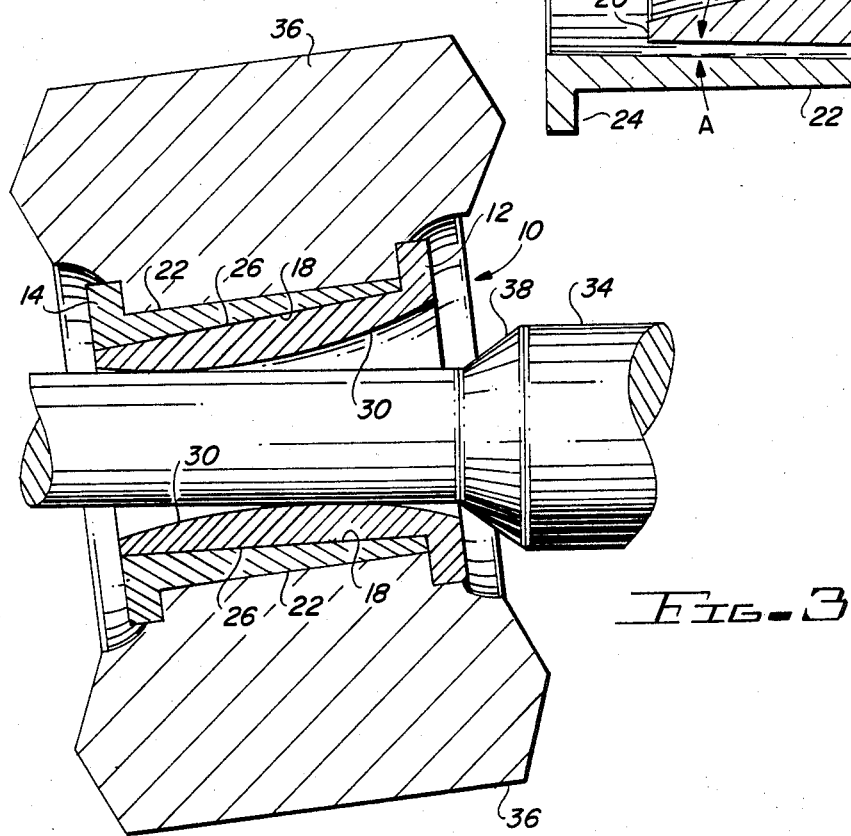

4,603,459

ROCKER BUSHINGS FOR PIVOTAL MOVEMENT

BACKGROUND OF THE INVENTION

1. Field of the Invention

This invention relates in general to a load bearing bushing and, in particular, to an improved boat trailer bushing and method permitting gimbaling of roller supports on a boat roller shaft, suitable for bearing the load of a boat.

2. Background Discussion

In certain roller installations in support of boat structures, it is desirable to permit the roller to tilt relative to the boat roller shaft when the boat is being put in or hauled out of the water, thereby angling the roller structure relative to the center axis of the pin. Because of this pivotal motion, the roller moves in planes angled other than normal to the shaft, resulting in a gimbaling effect. The gimbaling effect allows the roller to engage the boat hull at an angle to facilitate the movement of the hull across the boat trailer. The gimbaling rotation of the roller is advantageous where a boat hull of varying design and shape is moved over the support rollers of the trailer and the like while loading or unloading the boat into or from the water. Even when a relatively large number of rollers are used to support the boat, it is desirable to have each roller self align to cause its tread to engage the hull across its full tread width, as compared to much smaller engagement along only an outer edge of the tread. A gimbaling roller thereby automatically self aligns and allows a full tread to follow and engage the changing contours of the hull and thereby minimize stress concentrations on the hull.

In U.S. Pat. No. 4,196,502, an insert member bearing bushing for a boat roller shaft was formed of two separate substantially identical washer or insert bearing members having curved sections. Each bearing member possessed an annular configuration and an approximately funnel like form with an inner peripheral curve section. The roller had to be structured with roller grooves adapted to receive each member. The prior art bearings were forced into the roller grooves to retain the bearing members inside the roller structure. The bearings could only be used with rollers that had special adapted grooves for the insertion of the bearing members. These bearings only supported the roller over a narrow surface area and resulting in a non-uniform load force being applied to the inner surface area of the roller, which could result in deformation of the roller. The deformation is magnified when the roller is tilted to its maximum, because the normal force of the load of the boat is not applied to the bushing, but instead had to be absorbed by the roller. This causes the roller to deform and contact the shaft, causing the roller to bind on the shaft.

SUMMARY OF THE INVENTION

The bushing of the present invention is designed to support a wide variety of roller supports, through a self contained unified structure. The bushing uses a method to uniformly apply the load force equally over the inner surface area of the roller, to minimize the effect of deformation, due to the load of a boat.

The bushing is comprised of a cylindrical male and female member, being of annular cross-section, surrounding a shaft, for supporting a roller structure. The male and female member each have a longitudinal portion and an outer portion. The outer portion of each is in the form of a stop flange. The longitudinal portion of the male member is inserted into the female member until the male stop flange is reached, while the male member's inner surface is bearing against the shaft. The male member also includes a curved inner diameter surface positionally adjacent to the shaft, forming a bearing surface therefore, to allow the roller to gimbal about the center axis of the shaft. The female member longitudinal portion is designed to receive the male member, while the outer surface of the female member is bearing across the full width of the roller.

It is therefore an object of the present invention to improve the structural support of the bushings on a roller structure for a boat trailer or the like.

Another object of the invention is to provide rocker bushing members on a boat trailer for gimbaling movement of the roller when in contact with a boat hull.

A further object of this invention is to permit rocker bushings for roller supports without the necessity of modifying the roller structure for insertion of the bushings.

It is yet another object of this invention to permit rocker bushings to support a roller structure across the full width of the roller.

There is still another object of this invention to permit rocker bushings to be used with roller structures which are not modified or adapted to retain rocker bushings.

It is another object of this invention to provide a method to distribute the load of a boat uniformly throughout a roller structure to prevent deformation and fatigue in the roller structure.

BRIEF DESCRIPTION OF THE DRAWINGS

FIG. 1 is a perspective view of the rocking bushings according to the invention;

FIG. 2 is an axial longitudinal section of the rocker bushing of FIG. 1;

FIG. 3 is a similar section view showing the rocker bushing supporting a roller structure mounted on a supporting shaft according to the present invention.

DESCRIPTION OF THE PREFERRED EMBODIMENT

The boat supporting bed or frame of an all roller boat trailer is generally provided with a plurality of boat supporting rollers which are mounted thereon in spaced relation to support a boat and to facilitate loading and unloading the craft to and from the trailer. The rollers will vary in number and placement on the trailer bed depending upon the size of the craft and the contour of the hull with which the rollers will engage.

This invention improves the structural support of the bushings for these rollers while permitting gimbaling of the rolelrs. The gimbaling allows the rollers to self align to cause its tread to engage the hull across its full tread width. The bushings are constructed to support the roller across the full inner diameter width to prevent distortion and roller fatigue.

Referring to FIG. 1 of the drawings it will be seen that the rocker bushing 10 according to this invention comprises essentially a male member 12 and a female member 14. Each member essentially consists of two similar portions.

Each member 12, 14 has a longitudinal cylindrical portion and an outer cylindrical stop flange. Each member 12, 14 is constructed of a resilient material of suitable hardness such as nylon. The male member 12 consists of a longitudinal cylindrical portion 18 and an end stop flange 16 opposite said portion 18. The longitudinal portion 18 of the male member is tapered in the longitudinal direction such that the male member can be inserted into the female member 14. The longitudinal taper 18 of the male member is a reduced taper in which the largest diameter of the longitudinal portion is near stop flange 16 and is reduced towards the end 20. The angle of taper (A) is approximately 5 degrees.

The female member 14 consists of essentially two similar cylindrical portions as the male member, a longitudinal portion 22 and a stop flange 24. The longitudinal portion 22 has a diameter which allows the insertion of the longitudinal portion 18 of the male member into the female member. The inner surface 26 of the female member 14 is tapered at the same angle as the male member 12. Thus, when the male member 12 is inserted into the female member 14 the outside surface area of the tapered longitudinal portion 18 of the male member will fit snugly into the tapered portion of the inner surface 26 of the longitudinal portion 22 of the female member 14. The outer surface of the longitudinal portions 14 of the female member 14 is designed to contact the inner diameter surface of a roller 36 (FIG. 3). The male member 12 is inserted into the female member 14 until the end 28 of the longitudinal portion 22 of the female member contacts the stop flange 16 thus forming a solid unified rocker bushing. The axial length of the longitudinal portion 18 of the male member is equal to the axial length of the longitudinal portion of the female member 22 plus the axial length of the female stop flange 24. Therefore, the end 20 of the male member will coincide with the end of the stop flange of the female member when the male member is totally inserted into the female member.

The angle (A) is chosen to prevent the female and male member from being formed apart when a load is applied to the roller. The force tending to separate the two members is equal to N sin(T), where N is the normal force applied to the roller from the load of the boat. For T small, the sin(T) isvery small and the force N sin(T) will be negligible. For T larger, the material chosen to construct the members must have a static adhesion friction force greater than the separation force.

Referring to FIG. 1, the shaft 34 is inserted into the inner cylindrical of the male member 12 along the center line 32. The inner surface 30 of the longitudinal portion 18 of the male member 12 is curved, so that when the rocker bushing 10 is inserted onto the shaft 34 the rocker bushing 10 is allowed to gimbal about the center of axis 32. The rocker bushing 10 comprised of the male member and female member is a solid unified unit. Thus, the rocker bushing can be mounted on the shaft without the aid or support of the roller structure. The solid construction of the rocker bushing 10 does not depend on any extrinsic structure.

FIG. 2 is a sectional view, as seen generally in a longitudinal center section of the rocker bushing 10. FIG. 2 shows the male member 12 in the process of being inserted into the female member 14. The inner surface 26 of the female member is shown with an angle of taper (A) which is approximately 5 degrees. The outer surface 18 of the longitudinal portion of the male member 12 is shown with the same angle of taper (A), such that when the male member is inserted into the female member 14 both members will form a solid unified rocker bushing with no unenclosed area of contact between surface area 18 and surface area 26. The outer surface 22 of the longitudinal portion of the female member 14 is shown as a horizontal surface to support a roller structure, however, the surface 22 can be modified, indented, or grooved to match the inside surface of any roller structure. The male member 12 is inserted into the female member 14 until the end 28 of longitudinal portion 22 of the female member abutts the stop flange 16 of the male member. It is important to note that the longitudinal portion 18 of the male member is longitudinally longer than the longitudinal portion 22 of the female member. Thus, the end 20 of the male portion of the male member 12 when it is inserted into the female member 14 will extrude through the stop flange portion 24 of the female member until the outer surface of the stop flange 24 is reached.

The male member 12 has an inner surface 30 of the longitudinal portion 18. The inner surface 30 is curved to allow the rocker bushing 10 to gimbal or wobble about a shaft inserted into the rocker bushing. The inner curved surface 30 extends from the outside of stop flange 16 to the outside of stop flange 24, thus completely supporting a shaft inserted into the rocker bushing.

FIG. 3 illustrates a roller assembly 36 mounted to rotate about shaft 34 supported by the rocker bushing 10. The roller body 36 is rubber or a resilient elastomeric material of suitable hardness which is molded so as to provide a peripheral cushion section, preferably with treads. The roller assembly 36 is mounted on the female member 14 of the rocker bushing 10. The outer surface of the longitudinal portion 22 of the female member supports the inner diameter surface of the roller assembly 36. The surface area of the longitudinal portion 22 of the female member 14 provides support across the full width of the roller 36. Thus when a load is applied to the roller 36, the force is uniformly distributed across the full width of the roller, which prevents fatigue and distortion of the roller. The roller assembly 36 and the rocker bushing 10 form a solid integral roller structure which allows the roller 36 to gimbal about the shaft 34 with no deformation in the rocker bushing 10. The integral structure of the male member and female member provides total support for the roller structure on the shaft 34. The curved surface 30 of the male member is shown. The curved surface 30 allows the roller assembly to gimbal or wobble about the shaft 34.

From the foregoing, it should be apparent that the unified structure of the rocker bushing provides an optimum of support for the roller assembly 36. The shaft 34 is inserted into the unified rocker bushing 10 and is limited to axial shifting on the roller by the shaft shoulder 38. The shaft shoulder 38 is slightly larger than the axial opening of the unified rocker bushing to prevent the bushing from sliding. The other end of the shaft 34 can contain a split ring or a locking member (not shown) to retain the roller assembly 36 and rocker bushing 10 on the shaft 34.

The roller assembly 36 is thus allowed to gimbal about the shaft 34 to support the varying shape of a boat hull while it is loaded or unloaded into the water. The integral structure of the rocker bushing prevents the roller from being deformed and thereby causing the roller assembly 36 from binding to the shaft 34. The male and female members 12, 14 of the rocker bushing 10 allow the rocker bushing to be used with a wide variety of roller assemblies. The female member of the rocker bushing can be adapted to support a roller assembly by modifying the outer surface of the longitudinal portion of the female member. The integral structure of the male and female member of the rocker bushing do not need external support from the roller assembly. Also the roller does not have to be modified or adapted to retain the bushing. Thus the rocker bushing provides a very sound structural unit to support the roller assembly and the weight of a boat.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best made for carrying out this invention, but that the invention will include all embodiments following within the scope of the appended claims.

What is claimed is:

1. A bushing for a shaft mounted roller structure adapted to bear the weight of a boat or the like, said bushing comprising:
   (a) a first and second member being of annular cross-section, surrounding the shaft and supporting the roller;
   (b) each annular member having a longitudinal portion of annular cross-section throughout the length thereof, and terminating at a radially outwardly extending stop flange of increased radial thickness with respect to the radial thickness of the longitudinal portion.
   (c) said first member having an inner bearing surface between said first member and the shaft;
   (d) said second annular member having a radial thickness for contacting and receiving the longitudinal portion of the first annular member to provide an adequate support thereof, between said first and second annular members; and
   (e) said second member having an outer forming support surface between said second member and the roller.

2. The bushing of claim 1, wherein the outer diameter of the longitudinal portion of said first annular member is equal to the inner diameter of the longitudinal portion of said second annular member for inserting the longitudinal portion of said first annular member.

3. The bushing of claim 2, wherein the outer diameter of the longitudinal portion of said first annular member is reduced tapered with the largest diameter of the longitudinal portion near the stop flange.

4. The bushing of claim 3, wherein the inner diameter of the longitudinal portion of said second annular member being tapered along the entire longitudinal portion receives a corresponding tapered outer diameter of the longitudinal portion of said first annular member forming a solid bearing thereof.

5. The roller bushing of claim 4, wherein said first annular member includes a curved inner diameter section positionally adjacent to the shaft to form a bearing surface therefore.

6. The bushing of claim 5, said curved inner diameter section is curved opposite direction that the shaft for gimbaling rotational movement of the roller structure.

7. The bushing of claim 6, wherein the width of the outer diameter of the longitudinal portion of said second annular member supports the full width of the roller.

8. The bushing of claim 4, wherein the width of the outer diameter of the longitudinal portion of said second annular member supports the full width of the roller.

9. A bushing for a shaft-mounted roller structure adapted to bear the weight of a boat or the like comprising:
   (a) a male and a female member, being of annular cross-section, surrounding the shaft and supporting the roller structure;
   (b) said male member having a first portion for inserting into said female member, and a second outer portion preventing said male member from passing through said female member and roller structure, while said male first portion is bearing against the shaft;
   (c) said female member having a first portion for receiving said male member, and a second portion preventing said female member from passing through said roller structure, while said female first portion is bearing against the roller structure.

10. The bushing of claim 9, wherein said second portion of each member comprises a radially outwardly extending stop flange of increased radial thickness with respect to the radial thickness of the first portion.

11. The bushing of claim 10, wherein said first portion of each member comprises a longitudinal extending cylindrical structure.

12. The bushing as recited in claim 11, wherein said female and male member are opposite tapered for said female member to receive said male member.

13. The bushing as recited in claim 12 wherein said male member having a first portion surface bearing against the shaft forms a curved surface.

14. The bushing as recited in claim 13, wherein said curved surface is curved opposite direction than the shaft for gimbaling locational movement of the roller structure about the shaft.

15. The bushing as recited in claim 9, wherein said inner portion of said female and male member are opposite tapered for said female member to receive said male member.

16. The bushing as recited in claim 15, wherein said male member having a first portion surface bearing against the shaft forms a curved surface.

17. The bushing as recited in claim 16, wherein said curved surface is curved opposite direction than the shaft for gimbaling locational movement of the roller structure.

18. A method for supporting the weight of a boat or the like, having a bushing for a shaft-mounted roller structure, said method comprising the steps of:
   (a) surrounding the shaft with a bushing having first and second members, each member being of annular crosssection throughout the length thereof, and terminating in a radially outwardly extending stop flange of increased radial thickness with respect to the radial thickness of a previous portion of the member;
   (b) inserting the first member into the second member to form a bearing surface positional adjacent to the shaft and an adequate bearing support for the roller;
   (c) distributing the load of the boat evenly over the bearing support for the roller;
   (d) gimbaling the bushing so that the roller self aligns to cause the roller to engage the hull across its full width.

* * * * *